Nov. 24, 1931.  W. T. BARKER, JR  1,833,479
GLASS FEEDING APPARATUS AND METHOD
Filed Nov. 1, 1927  3 Sheets-Sheet 1
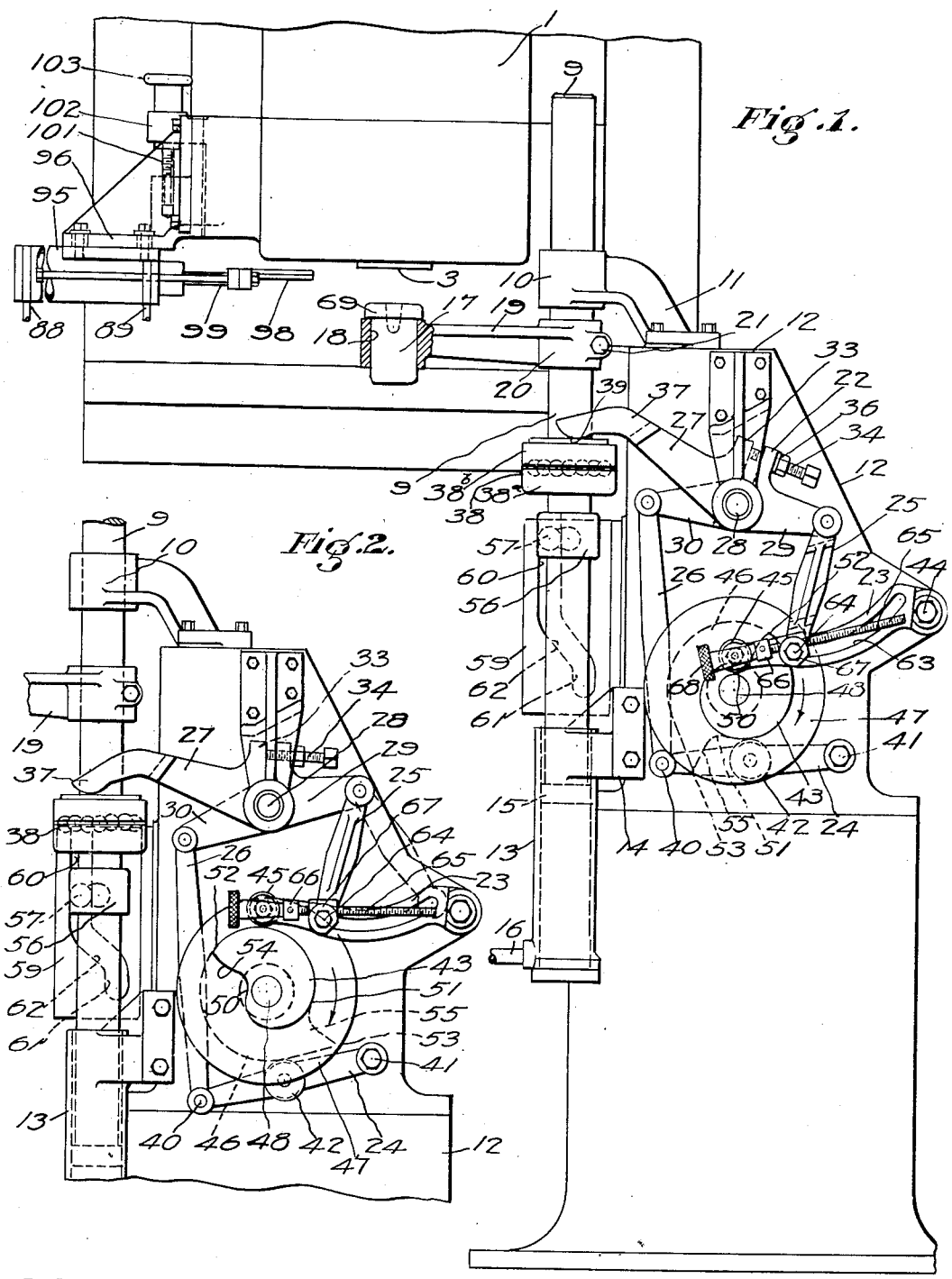
Witness
A. C. Kaiser
Inventor:
William T. Barker Jr.
by Robert D. Brown
Attorney.

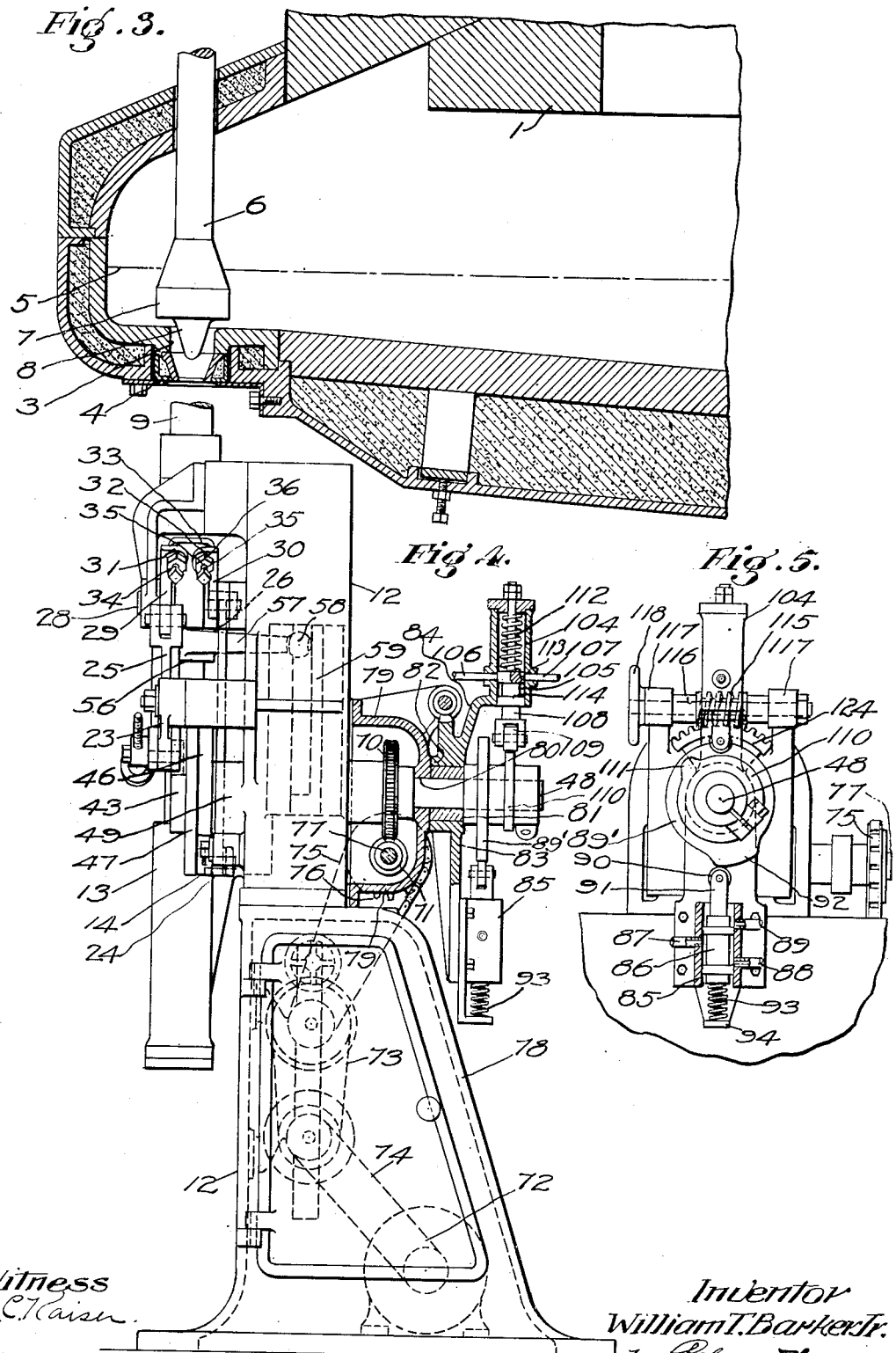

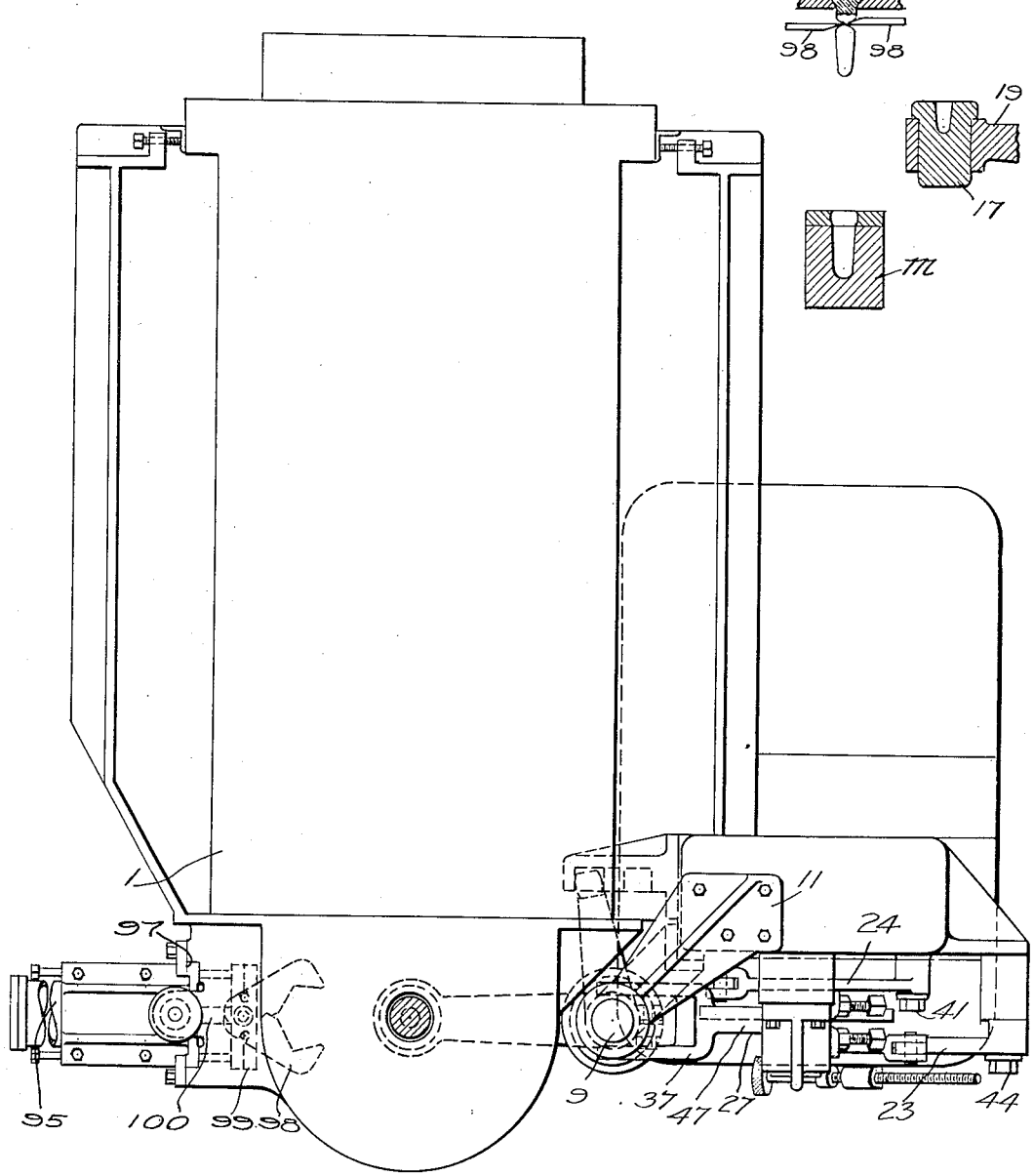

Patented Nov. 24, 1931

1,833,479

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE

GLASS FEEDING APPARATUS AND METHOD

Application filed November 1, 1927. Serial No. 230,228.

This invention relates generally to the feeding of molten glass from a forehearth of a glass melting tank or like container in mold charges and more particularly to an improved apparatus for and method of obtaining mold charges of regulably controlled shape, size, weight and condition and severed while in suspension below the outlet of a glass container from a stream of molten glass issuing continuously through the outlet.

The art of feeding molten glass in mold charges, which are severed while in suspension, from the source of glass supply, for delivery en masse to the molds of an associated glassware fabricating machine has been the subject of much study, research and experimentation during recent years, and, as a result thereof, various types of automatic suspended charge feeders have been provided. Most of such suspended charge feeders make provision for regulating the flow of molten glass through the outlet of an associated glass container by imparting periodic flow accelerating and retarding impulses, in a cyclic order, to the glass in the container above the outlet, either by reciprocating an implement in the glass toward and from the outlet or by applying alternating super-atmospheric and sub-atmospheric pressures to the glass in the container, thus aiding in suspending the glass issuing from the outlet in successive masses from the outlet and in shaping such masses while they are thus suspended. In such feeders, shears are closed periodically beneath the outlet to sever the successive mold charges from the suspended masses as soon as such masses have attained a desirable shape, which can be regulated by varying the relative timing of the shearing operations and the flow accelerating and retarding impulses on the glass in the container, by varying the character of the impulses on the glass in the container, by varying the timing of the successive accelerating and retarding influences on the glass, or by varying the speed at which the shear blades cut through the suspended mold charge masses. Another successful type of suspended charge glass feeder makes use of a combustion cup which is brought from below into capping relation to the glass discharge outlet after each severing operation, both for reheating the glass stub and for regulably retarding the extrusion of glass from the outlet after each severing operation and thereby aiding in shaping the succeeding mold charge. This combustion cup may be moved downwardly ahead of the glass gather but always out of bodily contact therewith.

In the use of the suspended charge feeders of the types referred to, the ranges of viscosity and temperature of molten glass suitable for feeding separated charges of accurately predetermined shape and size are relatively narrow, for the reason that the glass must be sufficiently viscous to be adapted to accumulate in suspension beneath the outlet in a mass at least sufficient for the mold charge that is desired before such mass breaks into a stream, and at the same time, the glass to be fed must be sufficiently fluid to flow quickly enough when the flow thereof through the outlet is unretarded or accelerated to produce a relatively large number of successive mold charge masses per minute.

Some of the feeders which have been provided prior to the present invention have included devices for catching and husbanding glass flowing downwardly from an outlet of a glass container until a quantity of glass sufficient for a mold charge has been accumulated. The accumulated glass then was delivered either directly or by means of a trough or other transfer device into a mold of a shaping machine. Such stream feeders require the use of a relatively hot and viscous glass in order to minimize the deleterious effects in the ware of the coiling and lapping of successive portions of the glass stream received in the husbanding device for each charge. Consequently, it usually was necessary to temporarily stop the flow of glass through the outlet between the accumulations of successive quantities of glass below the outlet. Such stream feeders did not include adequate facilities for pre-shaping the mold charge masses to fit the molds for which they were intended and preshaping, when any was attempted, usually was practically nullified when the transfer of the accumulated quantities of glass to the molds was effected. Moreover, the means for and the manner of accumulating and transferring successive quantities of glass to the molds usually caused unequal temperature conditions in different portions of a mold charge and unequal chilling of different portions of the surface of the charge, with resultant imperfections in the ware that was subsequently formed of such charges.

It also has been proposed to mechanically support the lower end of a downwardly moving glass gather that has issued from the outlet of a glass container, to move the support downwardly always in line with the gather, and to simultaneously sever the gather from the oncoming glass, and mechanically sweep it laterally into a trough leading to a mold.

An object of the present invention is to provide a highly efficient automatically operable glass feeding apparatus which is adapted to feed molten glass in separated mold charges of accurately regulated predetermined shape and size, when such glass is within wider ranges of viscosity and temperature than have heretofore been feasible.

A further object of the invention is the provision of an improved glass feeding apparatus which will afford facilities for bodily supporting the lower end of a stream of molten glass issuing downwardly from an outlet of a glass container, regulably retarding the downward movement of the resultant glass gather to accurately shape such gather, then quickly withdrawing the undersupport from the gather in a downward and lateral direction, and severing the suspended gather thus preshaped for delivery en masse to a waiting mold.

A further object of the invention is to provide a glass feeding apparatus of the character described which is relatively simple in construction, but permits all necessary operating adjustments for obtaining mold charges of regulable size, shape and condition within relatively wide ranges.

A further object of the invention is the provision in a glass feeding apparatus of the character described of a novel and highly efficient adjustable mechanism for making use of power derived from a rotating shaft to cause a mold charge shape regulating downward stroke of a glass stream supporting cup at a regulable speed to shape the supported glass as desired, and a more rapid movement of the glass supporting cup downwardly and laterally to move it out of contact and line with the glass gather so that the glass gather may be severed and permitted to drop into an underlying mold or like receptacle.

A still further object of the invention is the provision of a novel means within a glass container for regulating the flow of glass into an outlet in the bottom of such container without permitting the flow of glass into the outlet to cause a vortex for entraining or drawing air into the glass in the outlet.

Other objects and advantages of the invention will be apparent from the following description, when considered in conjunction with the accompanying drawings, forming a part of this application, in which Figure 1 is an end elevation of a forehearth of a glass melting tank equipped with a glass feeding apparatus embodying mechanical features of the invention, Fig. 2 is a fragmentary elevational view similar to Fig. 1, showing only part of the glass feeder and showing the operating parts of such feeder in positions different from those illustrated in Fig. 1, Fig. 3 is a fragmentary longitudinal vertical section through the forehearth, showing the improved structure that the invention provides for regulating flow of glass from the forehearth into the outlet, Fig. 4 is a view of the feeder, taken at right angles to Figs. 1 and 2 and mainly in elevation but partly in section.

Fig. 5 is a fragmentary view mainly in elevation and partly in section of the mechanism that is included in the feeding apparatus for controlling the operations of the glass severing mechanism and an associated fabricating machine in variably timed relation to the operations of the charge controlling glass stream supporting means, Fig. 6 is a plan view of the structure shown in Fig. 1, Fig. 7 is a fragmentary vertical sectional view, showing that the charge regulating cup is moved to an out-of-the-way position after a gather has been shaped to permit the severed preshaped gather to fall directly downward into the mold in which it is adapted to fit.

The improved feeder includes a cup and cup supporting and operating mechanism for periodically moving the cup upwardly from its lowest position, first laterally of the axial line of the flow outlet of the associated glass container and then in line with the flow outlet until the cup supports the lower end of the glass issuing from the outlet at a predetermined distance below the outlet. The cup supporting mechanism then is actuated to move the cup downwardly in supporting relation to the glass stream at a predetermined regulable speed less than that of the normal downward flow of the glass stream until the glass gather between the cup and the outlet has attained a predetermined desirable shape and length. The operating mechanism for the cup then moves it downward at a speed sufficient to clear the lower end of the glass gather, after which the cup is swung downwardly and laterally out of the path of movement of the glass gather.

Substantially coincident with the downward and lateral movement of the cup out of line with the glass gather, shears are closed beneath the outlet at a predetermined adjustable distance from the outlet to sever the glass gather from the glass issuing from the outlet and are then opened. The cup then is again returned upward to position to support the lower end of the issuing glass and to again retard the downward movement of such glass so as to effect shaping of the resultant glass gather.

The improved feeding apparatus comprises operating mechanism adjustable to vary the retarding effect on the downwardly moving glass below the outlet by varying the speed of the glass supporting downward stroke of the cup, whereby the shape of the resultant gather may be varied. The cup also may be manually adjusted vertically so as to vary the shape of the mold charges obtained by the use of the apparatus. Still another operating adjustment of the improved apparatus is to adjust the severing mechanism toward and away from the outlet so as to vary the distance of the severing plane from the outlet and thereby to vary the length of the mold charges that are obtained.

The apparatus also provides means for variable timing the operations of the severing mechanism in respect to the operations of the shape regulating cup, and for maintaining the same interval between each severing operation and the time of periodic actuation of an associated fabricating machine for forming the mold charges into articles of glassware.

Referring now to the drawings, a practical embodiment of the invention is illustrated in Figs. 1 and 6 in association with a forehearth 1 of a glass melting tank. As best seen in Fig. 3, the forehearth 1 is provided with a glass delivery outlet 3 in its bottom. This glass delivery outlet may be formed by clamping a removable outlet ring 4 against the bottom of the forehearth in alignment with a vertical aperture in the forehearth bottom. The ring 4 is preferably tapered toward its lower end.

The normal level of the glass in the forehearth is indicated at 5 in Fig. 3, so that the outlet is constantly submerged. The flow of glass from the forehearth through the outlet preferably is regulated by a vertically adjustable implement 6 having an enlarged head 7 at its lower end of greater cross sectional area than the upper end of the outlet and having a tapering tip 8 depending from the central portion of the head 7 into the outlet and of less area in cross section at its juncture with the head than the cross sectional area of the upper end of the outlet. The head 7 of the flow regulating implement has its lower face surrounding the tip 8 formed to seat tightly against the top of the outlet when the implement 6 is in its lowest position to completely cut off flow of glass from the forehearth into the outlet. Any suitable known means (not shown) may be provided for adjusting the implement 6 vertically toward and from the outlet. During feeding, the head 7 is raised from position to close the outlet so that the tapering tip 8 depends in the outlet more or less according to the amount of glass flow into the outlet that is desired. The glass flowing from the forehearth into the outlet must pass underneath the head 7 around the tip 8, thus precluding the formation of any vortex which might otherwise form at the center of the glass entering the outlet and cause air to be entrained with the issuing glass and subsequently to form bubbles in the ultimately produced glassware. The flow regulating implement may be rotated about its axis by any suitable known means (not shown) to thoroughly mix the glass admitted to the outlet.

The forehearth preferably is of insulated construction and may be heated by appropriately located suitable burners (not shown).

The improved apparatus includes a vertical shaft 9 that is movable vertically adjacent to the forehearth. The shaft 9 may extend slidably through a bearing 10 on the arm of a bracket 11 that is secured to the top of the supporting frame 12 of the apparatus so that the lower end of the shaft depends slidably in a vertical cylinder 13. The cylinder 13 is carried by a bracket 14 on a lower part of the main frame 12. The shaft 9 carries a piston 15 at its lower end which is adapted to reciprocate vertically in the cylinder 13 against an air cushion that is maintained in the lower part of the cylinder 13 by supplying air under pressure thereto through a suitable supply pipe, as at 16 the pressure maintained in this supply pipe is sufficient to cushion the downward movement of the shaft 9 and upon the lifting of the lever 27 is sufficient to raise the shaft 9 with the cup 17. However, the pressure is not strong enough to prevent the downward movement of the shaft when urged by the action of the lever 27.

A mold charge shape regulating cup 17 is removably mounted in a vertical opening 18 in one end portion of an arm 19. The other end portion of the arm 19 carries a split clamping collar 20 which embraces the shaft 9 and is releasably secured to the shaft by a suitable fastening device 21, so that the cup carrying arm may be adjusted vertically on the shaft. The arm 19 supports the cup 17 below and in line with the outlet 3 of the forehearth when the shaft 9 has been turned to a certain position about its axis. Downward movement of the shaft then will cause the cup 17 to move downward in line with the glass flow outlet 3.

The mechanism that the invention provides for moving the shaft 9 and the cup 17 downward, comprises a compound lever, generally indicated at 22 in Fig. 1, cam actuated levers 23 and 24, respectively, and links 25 and 26 which connect the levers 23 and 24, respectively, with the lever 22. The compound lever 22 comprises a lever member 27 that is pivoted on a horizontally disposed supporting pivot pin 28. The compound lever 22 also includes a pair of oppositely extending other lever members 29 and 30, respectively, which also are pivoted on the pivot element 28 and have substantially parallel side by side upstanding lugs 31 and 32, respectively, formed thereon in confronting relation to an upstanding lug 33 on the adjacent end portion of the lever member 27. Motion transmitting adjustable screws 34 and 35 are threaded through suitable openings in the lugs 31 and 32, respectively, against the lug 33 on the lever member 27 and may be locked to their supporting lugs 31 and 32 by lock nuts 36. The lever member 27 has a fork 37 at its free end arranged to straddle the shaft 9 above a thrust collar 38 on the shaft. The thrust collar 38 may comprise a collar section 38a secured firmly to the shaft, and an upper section 38b supported anti-frictionally on the lower section 38a. The arms of the forked end of the lever member 27 bear on the section 38b of the thrust collar and have their contact surfaces rounded, as indicated at 39 in Fig. 1.

The opposite ends of the lever members 29 and 30 from the lugs 31 and 32 are connected by the links 25 and 26, respectively, with the levers 23 and 24, respectively. The connection of the link 26 with the lever 24 is at one end of the latter, as at 40. The lever 24 is pivoted at its other end on a horizontal pivot element 41 and is provided intermediate its length with a cam roller 42 in rolling contact with a cam member 46 of a compound cam. The lever 23 is pivoted at one end on a horizontal pivot element 44 and carries a cam roller 45 at its opposite end in rolling contact with a cam member 43 of the aforesaid compound cam.

The compound cam comprises a disk 47 secured to a horizontal cam shaft 48 and provided at its opposite sides with the aforesaid cam members 43 and 46. The cam shaft 48 is suitably journaled, as at 49, in a portion of the main supporting frame structure 12, so that its axis is parallel with and directly beneath the axis of the pivot pin 28 on which the compound lever 22 is fulcrumed. The peripheral or working surface of each of the cam members 43 and 46 has a gradual rise extending through nearly 360° from the lowest place thereon, indicated at 50 on the cam member 43 and at 51 on the cam member 46, to the highest places 52 and 53 on the working surfaces of the cam members 43 and 46, respectively. The working surface of the cam member 43 then slopes abruptly, as indicated at 54, from the highest point 52 thereon to the low place 50 thereon. The working surface of the cam member 46 likewise slopes abruptly at 55 from its highest point 53 to its low place 51. The cam members 43 and 46 are mounted on the cam shaft 48 so that the high point 52 of the cam member 43 is substantially diametrically opposite the high point 53 of the cam member 46. The levers 23 and 24 and the cam rollers 45 and 42, which respectively are supported thereon, are so arranged that the cam roller 45 and the cam roller 42 are spaced apart substantially 180° around the axis of the cam shaft 48.

The shaft 9 carries a fixed collar 56 provided with an outwardly extending radial guide arm 57 (see Fig. 4). The outer end of the guide arm 57 is rounded, as indicated at 58, and is slidable in a guide groove in a fixed block 59 which may form a portion of the main supporting frame structure 12 or be secured to the latter in any suitable known manner. The guide groove comprises horizontally offset upper and lower vertical portions 60 and 61, respectively, connected by an inclined portion 62 (see Fig. 1). The arrangement is such that the cup 17 will be maintained in the line of flow from the outlet 3 of the forehearth when the guide arm 57 is in contact with the vertical upper portion 60 of the guide groove. When the guide arm 57 is moved from the vertical upper portion 60 of the guide groove along the inclined portion 62 of the guide groove, the shaft 9 will be turned about its axis as it moves axially downward so that the cup 17 will be swung downwardly and laterally from the line of flow from the outlet 3, and will be disposed entirely at one side of such line of flow when the guide arm 57 is in contact with the vertical lower portion 61 of the guide groove.

The lever 23 is formed with a slot 63 in which a pivot element 64 that connects the link 25 with the lever 23 is adapted to slide. The pivot element 64 may be adjusted along the slot 63 by means of an adjusting screw 65 which has a portion journaled in a swivel block 66 on the outer end portion of the lever 23 and is threaded through a nut 67 on an extending end portion of the pivot element 64. The adjusting screw 65 may be provided with a hand wheel 68 so that it can be conveniently manipulated to adjust the pivot element 64 along the slot 63. Adjustment of the pivot element 64 along the slot 63 will vary the amplitude of the throw of the lever member 27 and consequently will vary the extent of vertical movement of the cup carrying shaft 9. Actuation of the lever 23 by the cam member 43 is effective to move the cup 17 downward from its highest position for only part of each complete downward movement of the cup. The downward swinging movement of the lever member 27 to cause the remainder of the downward movement of the cup will result from the actuation of the member 27 from the cam actuated lever 24 through the intermediacy of the link 26 and the lever member 30. The slot 63 in the lever 23 is formed to coincide with an arc of a circle struck by a radius equal in length to the link 25 about the axis of the pivotal connection between the link 25 and the lever member 29 as a center when the cup carrying shaft 9 has been moved axially downward substantially to the position illustrated in Fig. 2, the adjustment screws 34 and 35 being in an intermediate position. At this time, the guide arm 57 is located above the lower end of the upper vertical portion 60 of the guide slot a distance sufficient to permit the cup 17 to be moved vertically downward a distance at least equal to the depth of the glass engaging cavity 69 in the cup 17. Consequently, adjustment of the pivot element 64 along the slot 63 will adjust only the upper limit of the upper portion of the stroke of the cup and will vary the rate of downward movement of the cup during such upper portion of its stroke. The associated screw 34 on the lug 31 of the lever 29 of course may be adjusted to compensate for the adjustment of the upper limit of the stroke of the cup by adjustment of the pivot element 64 along the slot 63, the screw 35 on the lug 32 of the lever 30 may be adjusted to vary the time at which the acceleration of the cup 17 is begun by the action of the cam 46.

The movement downward of the cup 17 from its highest position is relatively slow so long as the downward movement of such cup is caused by power transmitted to the lever member 27 from the cam actuated lever 23. However, as soon as the lever 23 no longer causes the actuation of the lever member 27, but such actuation of the lever member 27 to continue the downward movement of the cup is caused by power imparted to the lever member 27 from the cam actuated lever member 24, the further downward movement of the cup will be relatively rapid, for the reason that the oscillatory movement of the lever member 30 which takes place after the lever 24 becomes effective to actuate the lever member 27 is approximately twice as fast as the corresponding oscillatory movement of the lever member 29.

The cam shaft 48 may be driven from any suitable source of power. A satisfactory driving mechanism is shown more or less diagrammatically in Fig. 4 and comprises a worm wheel 70 secured on the shaft 48 in mesh with a worm 71 which receives motion from the power shaft of a motor 72 through a variable transmission mechanism 73. The variable transmission mechanism 73 may be of any suitable known construction, such as the well known Reeves type, and has suitable motion transmitting connections, as at 74 and 75, respectively, with the motor 72 and a sprocket or like motion transmitting member 76 on the worm supporting shaft 77, respectively.

The lower portion of the supporting frame structure 12 may be formed to provide a housing or case at 78 for the motor 72 and most of the motion transmitting elements of the drive mechanism. A housing 79 for the worm 71 and worm wheel 70 likewise may be provided and secured to the supporting frame structure 12 in any suitable known manner. This housing 79 may be provided with an opening at 80 from which an end portion of the cam shaft 48 protrudes.

The protruding end portion of the cam shaft carries a bushing 81 on which a hub 82 is rotatably mounted. The hub 82 has a pair of oppositely extending substantially radial arms 83 and 84, respectively. The arm 83 carries an open ended hollow valve casing 85. The axis of the valve casing 85 is located in a line extending radially from the axis of the cam shaft. A piston valve 86 is slidable in the valve casing 85 between a position to establish communication between a fluid pressure supply pipe 87 and a delivery pipe 88 and a position to cut off communication between the supply pipe 87 and the delivery pipe 88 and to establish communication between the supply pipe 87 and a second delivery pipe 89 (see Fig. 5). The delivery pipes 88 and 89 are connected with the valve casing 85 adjacent to opposite ends of the latter, and each is arranged to discharge through the adjacent end portion of the valve casing when it is out of communication with the supply pipe 87. A cam 89' is secured on the extending end portion of the shaft 48 and is effective to impart motion through a cam roller 90 to the stem 91 of the piston valve 86 so as to move the piston valve 86 to the position shown in Fig. 5 when the cam roller 90 is in contact with the high portion 92 of the cam 89'. When the roller 90 is out of contact with the high portion 92 of the cam 89' and is in contact with the concentric remaining portion of the periphery of the cam portion 89', a spring 93 will function to move the piston valve from the position shown in Fig. 5 to position to shut off flow of pressure fluid to the pipe 88 and to establish flow of pressure fluid through the valve casing from the supply pipe 87 to the delivery pipe 89. The spring 93 is located between the outer end of the piston valve 86 and a fixed stop 94 at the outer end of the valve casing.

The delivery pipe 88 connects with the outer end of a horizontal shear operating cylinder 95, Figs. 1 and 6. The pipe 89 leads to the opposite end of the cylinder 95. The shear operating cylinder 95 is carried by a bracket 96 which is adjustable vertically in a guideway 97 on the side of the forehearth so that the extended axial line of the cylinder will intersect the downwardly extended axial line of the outlet 3. A pair of shear blades 98 are pivoted on a horizontally movable shear blade supporting and actuating structure generally indicated at 99. The structure 99 may be of any suitable known or preferred construction adapted to be operatively connected with the cylinder 95 and with the stem 100 of a piston that is reciprocable in the shear cylinder so that the shear blades will be opened when the structure 99 is in retracted position, as shown in Figs. 1 and 6, and will be closed directly below the outlet when the shear blade supporting structure 99 has been projected from the cylinder toward the axial line of the outlet. The projection and retraction of the shear blade supporting and actuating structure 99 and the shear blades thereon toward and from the axial line of the outlet are caused by reciprocations of the piston in the shear cylinder 95 and such reciprocations result from the admission and exhaust of operating pressure fluid to and from the opposite ends of the shear cylinder 95 alternately through the pipes 88 and 89. The height at which the shear blades will close below the outlet may be adjusted by adjusting the bracket 96 vertically in the guideway 97 and this may be conveniently accomplished during the operation of the machine by means of an adjusting screw 101 which is journaled in a fixed lug 102 on the forehearth frame and is in threaded engagement with a portion of the bracket 96. The adjusting screw 101 may have an enlarged head or hand wheel 103 at its upper end.

The arm 84 carries a hollow valve casing 104 in which a piston valve 105 is slidable (see Fig. 4). The valve 104 has oppositely disposed intake and delivery ports connected with a pressure fluid supply pipe 106 and a pressure fluid delivery pipe 107, respectively. A stem 108 from the piston valve 105 extends toward the axis of the cam shaft 48 and carries a cam roller 109 in rolling contact with the periphery of a cam 110 on the shaft 48. The cam 110 has a projection 111 on its periphery for engaging the cam roller 109 to cause outward movement of the piston valve 105 in the casing 104 from the position shown in Fig. 4 against the action of a spring 112. When the piston valve 105 is in the position shown in Fig. 4, the supply of pressure fluid from the pipe 106 to the valve casing 104 is shut off, and any pressure fluid in the pipe 107 is permitted to escape therefrom through a passage 113 in the piston valve into the casing 104 and thence to the atmosphere. When the cam roller 109 traverses the projection 111 or high part of the working surface of the cam 110, pressure fluid passes from the supply pipe 106 through a circumferentially extending passage 114 in the piston valve to the delivery pipe 107. The delivery pipe 107 is intended to be connected with any suitable pneumatic operating mechanism for starting or causing a cycle of operations of an associated glass ware fabricating machine each time pressure fluid is admitted to the pipe 107 from the valve casing 104.

The cams 110 and 89' preferably are mounted on the shaft 48 in any suitable known manner so that they may be independently adjusted angularly about the axis of the shaft 48 and secured in different angularly adjusted positions or removed and replaced by other cams when desired. The relative times of occurrence of the opening of the valves 85 and 104 therefore may be varied when the machine is not in operation. The interval between the cam actuated operations of the valves 85 and 104 preferably is not changed after the cams 89' and 110 have been suitably adjusted angularly about the axis of the shaft 48. However, it is desirable that the times of the cam actuated operations of the shear control valve 85 and the trip off valve 104 for the fabricating machine shall be adjustable simultaneously and to the same extent in respect to the times of operation of the mold charge shape regulating cup. To this end, a segment of the worm wheel 124 is formed integral with the hub 82 and is in mesh with a worm 115 on a shaft 116. The shaft 116 is journaled in aligned spaced bearings 117 on extensions of the housing 79. A hand wheel 118 is secured to one end of the shaft 116 in position to be conveniently grasped and manipulated during the operation of the feeding apparatus to effect turning movement of the hub 82 and the parts carried thereby about the axis of the shaft 48 to advance or retard to the same extent the times of operation of the severing mechanism and the associated fabricating machine in respect to the times of operation of the shape regulating cup. The worm and worm segment cooperate to lock the hub 82 against accidental turning movement about the axis of the shaft 48.

From the foregoing description of the various parts of the device, the operation thereof will be readily understood. Molten glass flows by gravity and head pressure into the annular passage around the tip 8 of the flow regulating implement 6 into the outlet and thence issues downwardly in a mass which initially has substantially the same cross-sectional area as that of the lower end of the outlet. The suspended mass of glass would tend to break into a stream when it had sagged downwardly a short distance from the outlet but before this can happen, the operating mechanism of the improved feeding apparatus functions to permit the cup 17 to be moved upwardly by the action of the pressure fluid in the cylinder 13 until the lower end of the glass depending from the outlet is received in and supported by the cavity 69 of the cup 17. The cup 17 preferably is lined with a suitable carbon material, such as that disclosed in the U. S. patent application of Karl E. Peiler Serial No. 203,391, filed July 5, 1927, to which the molten glass will not stick and which will not cause objectionable chilling of the lower end of the glass gather. The operating mechanism of the feeding apparatus then functions to move the cup downwardly at a speed less than the normal downward movement of the suspended glass, thereby not only preventing the glass gather from breaking into a stream and out of control, but causing the oncoming glass to fill out the mass that is retarded by the cup so that such mass will have a shape suitable to adapt the mold charge that is subsequently severed therefrom to fit accurately in a mold of an associated fabricating machine. This shape may be varied by varying the rate of downward movement of the cup while it is in supporting relation to the issued glass, by varying the level at which the cup is moved into supporting relation to the downwardly moving suspended glass, or by using cups of different internal shapes and sizes at different times. When the cup has been moved downward to a certain level, as hereinbefore described, the operating mechanism of the apparatus acts to accelerate the downward movement of the cup so that the cup is moved straight downward until completely withdrawn from the shaped glass gather and then is moved laterally out of line with such glass gather. This withdrawal of the cup from supporting relation to the glass takes place when the supported glass has attained the shape desired. After the cup has been withdrawn downwardly and laterally, and while the gather retains the desired shape, the shear blades are caused to close beneath the outlet to sever the preshaped gather from the oncoming glass and such preshaped gather then falls downward into a waiting mold (see Fig. 7). The pressure fluid in the cylinder 13 then acts to again return the cup upward to its highest position below the outlet for supporting the succeeding mass of glass issuing from the outlet and a new cycle of operations of the apparatus is started. The length and shape of the mold charges thus obtained may be varied by adjusting the severing plane vertically in respect to the outlet in the manner hereinbefore described.

The cam members 43 and 46 of the cup actuating cam may be replaced by cam members of different contours, if desired, to vary the relative speeds of movement of the different parts of the downward stroke of the cup. This permits a selection of cams for suitably and variously controlling the shape imparted to different portions of the issuing glass which are to form the mold charges and permits the use of my apparatus in feeding charges of a great variety of shapes. The speed of the glass supporting upper part of the downward stroke of the cup may be varied within a considerable range during the operation of the machine by adjusting the pivot 64 along the slot 63 of the lever 23 without causing any variation in the speed of downward movement of the cup during the remainder of its downward stroke and without changing the level at which the cup will start to move away from supporting relation to the preshaped glass gather.

It will be apparent from the foregoing description that the apparatus hereinbefore described affords all necessary facilities and operating adjustments for securing separated mold charges of accurately regulated shape, size and condition from molten glass issuing downwardly in a stream from a submerged outlet of a glass container and having a viscosity and temperature varying within relatively wide ranges but always suitable for the mold charges that are desired. The shape regulating function of the cup is performed without objectionable chilling of the supported mold charge mass. The axis of the supporting cup is aligned with the axis of the outlet when the cup is in its glass supporting position so that the retardation of downward movement of the glass gather by the cup will cause the glass gather to be filled out uniformly from its axis by the oncoming glass. The preshaped gathers thus will be of axially symmetrical shape, viscosity and temperature and when severed will be well adapted to serve as mold charges in the production of practically perfect high grade glassware.

The screws 34 and 35 may both be adjusted during the operation of the apparatus to vary vertically the path of the reciprocations of the cup 17 and may be relatively adjusted to vary the characteristics of the downward stroke of the cup.

I claim:

1. In glass working apparatus, a container for molten glass having an outlet for the delivery of glass in a downwardly flowing stream, a movable support adapted to contact with the lower end of the stream, cam actuated means for causing a predetermined downward movement of said support while in supporting contact with the stream to shape the stream as desired, means for severing the stream from the oncoming glass when said stream has attained the desired length and shape, and fluid pressure operated means for returning said support upward into supporting contact with the new stream.

2. In glass working apparatus, a source of supply of molten glass having a flow opening through which glass may issue downwardly in a stream, a movable support for the free end of the stream, means for moving said support downwardly, first at a speed less than that of the rate of normal downward flow of the stream and in supporting contact with the stream and then at a speed sufficient to move the support out of contact with the stream, and means for moving said support laterally out of line with said stream when it has moved out of contact with said stream.

3. In glass working apparatus, a source of supply of molten glass having a flow opening through which glass may issue downwardly in a stream, a movable support for the free end of the stream, means for moving said support downwardly, first at a speed less than that of the rate of normal downward flow of the stream and in supporting contact with the stream and then at a speed sufficient to move the support out of contact with the stream, and means for adjusting said support operating means to vary the level of the beginning of said glass stream supporting movement of said support.

4. In glass working apparatus, a source of supply of molten glass having a flow opening through which glass may issue downwardly in a stream, a movable support for the free end of the stream, means for moving said support downwardly, first at a speed less than that of the rate of normal downward flow of the stream and in supporting contact with the stream and then at a speed sufficient to move the support out of contact with the stream, and means for adjusting said support operating means to vary the level of the beginning of said glass stream supporting movement of said support without changing the level at which said glass supporting movement will stop.

5. In glass working apparatus, a source of supply of molten glass having a flow opening through which glass may issue downwardly in a stream, a movable support for the free end of the stream, means for moving said support downwardly, first at a speed less than that of the rate of normal downward flow of the stream and in supporting contact with the stream and then at a speed sufficient to move the support out of contact with the stream, and means for adjusting vertically the entire path of the glass supporting movement of said support.

6. Glass working apparatus comprising a container for molten glass having a flow outlet in its bottom through which glass may issue in a stream, an axially movable and rotatable shaft adjacent to the container, a cup adapted to receive and shape the lower end of the glass stream, an arm adjustable vertically on said shaft for supporting said cup below the outlet, means controlling the extent of axial and angular turning movements of said shaft for maintaining the cup in line with the outlet for part of its downward movement from the top of its stroke and for moving the cup out of line with the outlet during the remainder of its downward stroke, cam actuated means for causing the down stroke of the shaft at a relatively slow speed for part of said down stroke to move the cup downward in supporting contact with the glass stream and then at an accelerated speed to move the cup out of supporting contact with the glass stream before the cup is swung out of line with the glass stream, means for adjusting said shaft operating means to vary the speed of downward movement of the shaft for the glass stream supporting part of said stroke, and fluid pressure operated means for causing a return upward stroke of said shaft and cup.

7. In glass working apparatus, a support adapted to move in the direction and line of flow of a stream of glass for temporarily supporting said stream, a cam for actuating the support at selected speeds for a portion of its movement and another cam for actuating the support at a higher speed for a different part of its movement.

8. In glass working apparatus, a support adapted to move in the direction and line of flow of a stream of glass for temporarily supporting said stream, and operating means for moving the support in said direction, said operating means comprising a compound lever comprising a pivoted work arm or member for actuating the support and a pair of pivoted power receiving members, a rotating power shaft, a cam member on said shaft for each of said power receiving lever members, individual levers oscillated by the respective cam members, and links connecting the respective last named levers with the pivoted power receiving members of the first named lever, said cams and said motion transmitting connections between the cams and the power receiving members of the first named lever being adapted to render the respective power receiving members effective successively to actuate said power applying lever member so as to move said support at different speeds during successive parts of its stroke.

9. In glass working apparatus, a support adapted to move in the direction and line of flow of a stream of glass for temporarily supporting said stream, and operating means for moving the support in said direction, said operating means comprising a compound lever comprising a pivoted power applying member for actuating the support and a pair of pivoted power receiving members, a rotating power shaft, a cam member on said shaft for each power receiving lever member, individual levers oscillated by the respective cam members, links connecting the respective last named levers with the pivoted power receiving members of the first named lever, said cams and said motion transmitting connections between the cams and the power receiving members of the first named lever being adapted to render the respective power receiving members effective successively to actuate said power applying lever member so as to move said support at different speeds during successive parts of its stroke, and individual adjustable contact members for imparting motion from the power receiving members to the power applying member of said first named lever.

10. In glass working apparatus, a support adapted to move in the direction and line of flow of a stream of glass for temporarily supporting said stream, and operating means for moving the support in said direction, said operating means comprising a compound lever comprising a pivoted power applying member for actuating the support and a pair of pivoted power receiving members, a rotating power shaft, a cam member on said shaft for each power receiving lever member, individual levers oscillated by the respective cam members, links connecting the respective last named levers with the pivoted power receiving members of the first named lever, said cams and said motion transmitting connections between the cams and the power receiving members of the first named lever being adapted to render the respective power receiving members effective successively to actuate said power applying lever member so as to move said support at different speeds during successive parts of its stroke, and means for adjusting the motion transmitting connection of one of said links and its actuating lever longitudinally of the said lever.

11. The method of feeding mold charges of molten glass of shape suitable to the molds to be fed, which comprises flowing glass downwardly through an outlet, supporting the lower end of the issuing glass by a movable supporting member in contact with the glass, moving the supporting member downwardly while in contact with the glass at speeds selected with respect to the shape of the charge desired and thereby shaping the issued glass and moving the supporting member rapidly downwardly and out of the path of movement of the glass, causing the glass so shaped to become temporarily suspended from the outlet, severing a mold charge from such glass while it still retains the desired shape depending upon the shaping operation above recited, and repeating the said steps in connected successive cycles.

12. In glass feeding apparatus in combination, a container for the glass having a submerged outlet, a flow controlling support adapted to be moved into and out of alignment with the outlet and toward and from the outlet and adapted during a part of its movement to contact with the lower end of the glass issuing from the outlet and to control the rate of downward movement thereof, means for moving the support comprising a removable cam of contour selected in accordance with the shape of mold charge desired and adapted to control the movement of the support while in contacting relation with the glass, severing means adapted to periodically sever the glass below the outlet, and means for operating the severing means in such time relation with the movements of the support as to sever mold charges from the stream after the removal of the support from contact therewith but while said stream retains a shape dependent upon the operations of the support.

Signed at Hartford, Connecticut, this 29th day of October, 1927.

WILLIAM T. BARKER, Jr.